United States Patent [19]

Hama

[11] Patent Number: 5,592,337
[45] Date of Patent: Jan. 7, 1997

[54] MIRROR FASTENER FOR OPTICAL SCANNING DEVICE

[75] Inventor: Yoshihiro Hama, Tokyo, Japan

[73] Assignee: Asahi Kogaku Kogyo Kabushiki Kaisha, Tokyo, Japan

[21] Appl. No.: 547,191

[22] Filed: Oct. 24, 1995

[30] Foreign Application Priority Data

Oct. 27, 1994 [JP] Japan .................................. 6-287386

[51] Int. Cl.⁶ .......................... G02B 7/182; G02B 26/08
[52] U.S. Cl. ........................... 359/872; 359/216; 359/871
[58] Field of Search ..................... 359/196–226, 359/872, 846–848, 862, 833, 871, 838, 873, 881; 248/468, 476–478

[56] References Cited

U.S. PATENT DOCUMENTS

| | | |
|---|---|---|
| 4,868,673 | 9/1989 | Negoro . |
| 4,948,243 | 8/1990 | Saito . |
| 4,998,790 | 3/1991 | Iizuka et al. . |
| 5,130,840 | 7/1992 | Iima et al. . |
| 5,134,513 | 7/1992 | Morimoto . |
| 5,194,982 | 3/1993 | Morimoto . |
| 5,194,994 | 3/1993 | Takizawa et al. . |
| 5,218,461 | 6/1993 | Aoyama et al. . |
| 5,299,050 | 3/1994 | Morimoto et al. . |
| 5,369,456 | 11/1994 | Yokota . |
| 5,390,051 | 2/1995 | Saito et al. . |
| 5,408,095 | 4/1995 | Atsuumi et al. . |
| 5,452,119 | 9/1995 | Morimoto et al. . |

FOREIGN PATENT DOCUMENTS 6-265810  6/1994  Japan .

*Primary Examiner*—James Phan
*Attorney, Agent, or Firm*—Greenblum & Bernstein P.L.C.

[57] ABSTRACT

A mirror mount having internal protrusions accepts a snap-in fastener. The snap-in fastener is supported by one side of the protrusions, and resiliently holds the mirror against the remaining side of the protrusions. The fastener is also engaged to the rear surface of the mirror mount. The engaging portions press the fastener against the one side of the protrusions to provided support and resistance against movement.

13 Claims, 5 Drawing Sheets

MIRROR FASTENER FOR OPTICAL SCANNING DEVICE

BACKGROUND OF THE INVENTION

The present invention relates to a fastener device used for fixing a mirror to a housing, and more specifically, for fixing an optical path bending mirror within a housing of an optical scanning device used in laser beam printers. The optical path bending mirror deflects a scanning laser beam toward a photoconductive drum.

In a conventional optical scanning device employed in a laser beam printer, a scanning laser beam is ultimately deflected by an optical path bending mirror to be incident onto a photoconductive drum. The optical path bending mirror must be fixed at both ends in the main scanning direction. Further, since the optical path bending mirror is customarily an elongated glass plane having a metal mirror surface deposited thereon, the use of an adhesive poses various problems, and the mirror is therefore conventionally affixed at both ends by metal fittings screwed to the housing.

However, when the optical path bending mirror is secured to the housing, using the conventional metal fittings a multiplicity of operation steps are necessary. For example, setting of the mirror, setting of at least two metal fittings, and screwing two or more metal fittings to the housing are required. Also included is some type of adjustment step, in order to properly position the mirror. When using metal fittings, more than one adjustment step may be necessary. The housing must also be provided with two or more screw holes for the fixing of the metal fittings.

SUMMARY OF THE INVENTION

It is therefore an object of the present invention to provide an improved mirror fastening structure for an optical scanning device capable of easily fastening the optical path bending mirror into the device.

In order to achieve the objects of the invention, a mirror securing apparatus for an optical scanning device includes: an oblong mirror having a front mirror side for reflecting a scanning light beam, and a back side with the oblong mirror extending in a main scanning direction of the optical scanning device. A mirror mount is formed in the optical scanning device and has a rear surface formed therein. A plurality of protrusions are formed on the mirror mount, each of the protrusions having a first side for contacting the back side of the oblong mirror and a second side opposite the first side, the second side facing the rear surface of the mirror mount and having a clearance therebetween. A fastener for holding the oblong mirror in the mirror mount is also included. The fastener includes: a rear wall arranged between the back side of the oblong mirror and the rear surface of the mirror mount, the rear wall having substantially the same length in the main scanning direction as the oblong mirror; at least two resilient arm portions extending from the rear wall, for holding the oblong mirror at least toward opposite ends in the main scanning direction of the oblong mirror; and at least one resilient engaging portion for engaging the rear surface. The at least one resilient engaging portion is inserted in the clearance between the second side of the protrusions and the rear surface of the mirror mount.

In this manner, the resilient arms are able to accurately position the mirror, while also using the rear surface of the protrusions as a support. In other words, the mirror and the protrusions are held together between the rear wall and resilient arms of the fastener. At the same time, the fastener and mirror are prevented from moving by the engagement to the rear surface of the mirror mount. Thus, the mirror may be quickly positioned and secured by the engagement of the fastener to the mirror mount.

Preferably, the resilient arm portions are formed at least toward opposite ends in the main scanning direction of the rear wall, and the resilient arm portions hold the back side of the oblong mirror against the first side of the protrusions. Further preferably, at least two resilient arms are positioned in the main scanning direction to align with corresponding protrusions of the plurality of protrusions. In this manner the resilient arms are able to accurately position the mirror using the protrusions as a reference surface, and to hold it at both ends. The resilient arm portions may include a hemispherical protrusion near a distal end thereof for point contacting the front mirror side of the oblong mirror.

In one preferred embodiment, the rear surface of the mirror mount has engaging slots formed therein for mating with the engaging portions, and each of the engaging portions has a hook for mating with the engaging slots of the mirror mount formed at a distal end thereof. The hooks extend in the direction of the rear surface of the mirror mount. Each of the engaging portions is substantially coplanar with the rear wall and resiliently swingable with respect to the rear wall. Accordingly the engagement of the fastener to the mirror mount is accomplished by snapping the hooks into the slots, with the snapping being aided by the resiliency of the engaging portions.

According to another preferred embodiment, an adjusting portion for adjusting an angle of the optical path bending mirror is provided on one end, in the main scanning direction, of the mirror mount. The adjusting portion may include a stepped portion integral with the mirror mount and an adjusting screw penetrating the stepped portion and contactable to the back side of the mirror. The adjusting screw is rotatable to minutely adjust the angle of the optical path bending mirror.

According to another aspect of the present invention, a mirror securing apparatus for an optical scanning device includes an oblong mirror having a front mirror side for reflecting a scanning light beam and a back side, the oblong mirror extending in a main scanning direction of the optical scanning device. A mirror mount is formed in the optical scanning device and has a rear surface formed therein. A plurality of protrusions are formed on the mirror mount, each of the protrusions having a first side for contacting the back side of the oblong mirror and a second side opposite the first side, the second side facing the rear surface of the mirror mount and having a clearance therebetween. A fastener for holding the oblong mirror in the mirror mount includes first resilient means for pressing the fastener against the second side of the protrusions; second resilient means for pressing the back side of the oblong mirror against the first side of the protrusions. The second resilient means acts on the front mirror side of the oblong mirror. Engaging means are provided for engaging the fastener to the rear wall of the mirror mount.

Consequently, the fastener, supported by the second side of the protrusions, holds the mirror using the first side of the protrusions as a reference surface, while the fastener and mirror are held immobile by the engaging means.

DESCRIPTION OF THE ACCOMPANYING DRAWINGS

DESCRIPTION OF THE EMBODIMENTS

The device of the embodiment is a fastening device to be applied to a mirror of an exposure unit of a laser beam printer.

The printer in which the embodiment is applied operates generally by scanning an electrostatic latent image onto a photoconductive drum 18 by means of a laser beam modulated by an input signal.

Hereinafter, in the context of this specification, the term "main scanning direction" is defined as the direction in which the laser beam deflected by a polygonal mirror 14 scans, (i.e., if projected back along the optical path, in a direction that is ultimately parallel to the rotational axis of the photoconductive drum 18 when the beam reaches the drum 18). Furthermore, the "sub-scanning direction" is defined as perpendicular to the main scanning direction, with reference to the optical path of the main scanning beam (i.e., if projected back along the optical path, in a direction that is ultimately tangent to the cylindrical surface of the drum 18 when the beam reaches the drum 18).

Figure 1:
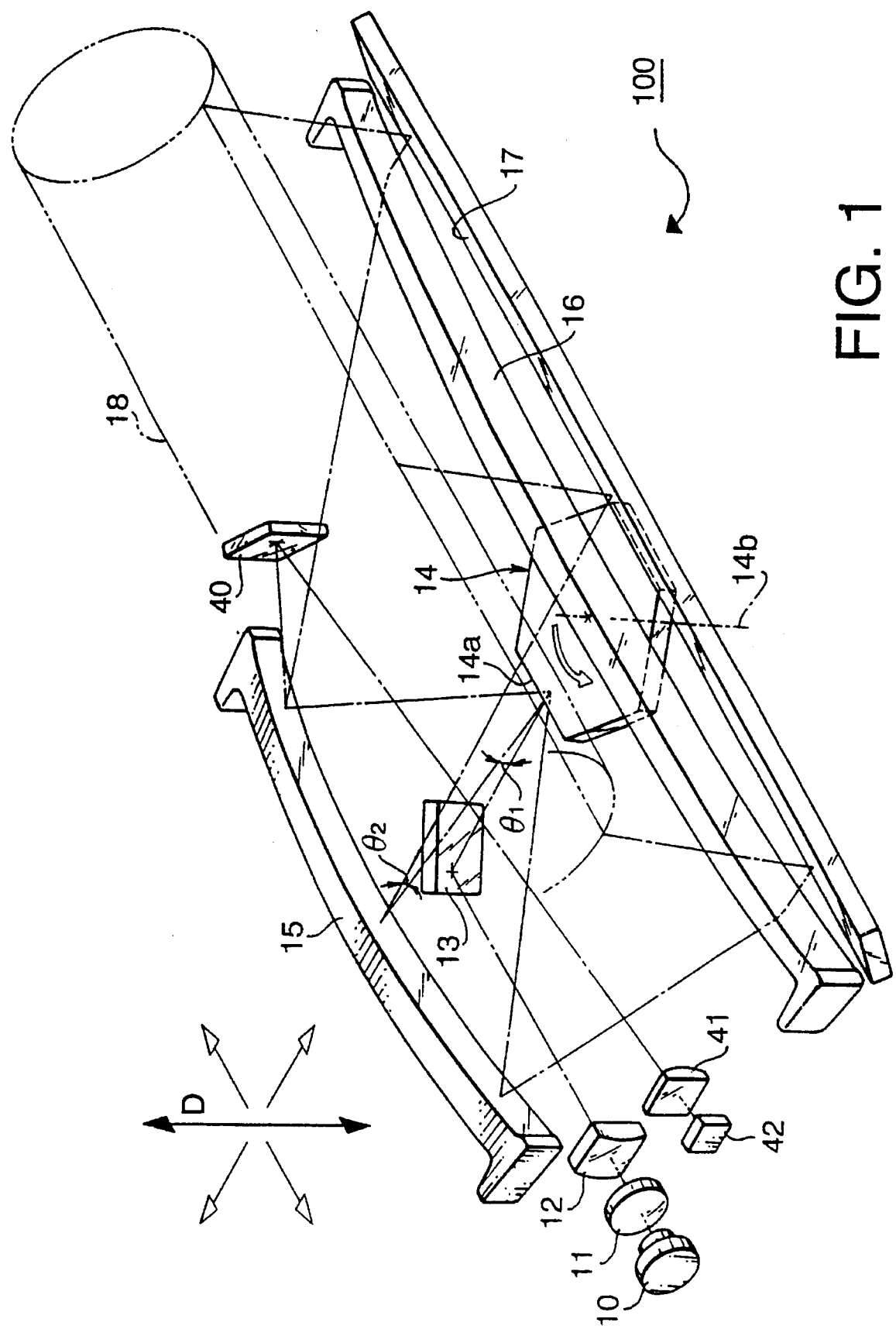
FIG. 1 is a simplified perspective view of an optical system as applied in the embodiment of the invention.

Thus, for all of the optical elements in the system, except an optical path bending mirror 17, the sub-scanning direction is generally in the depth direction (general direction D in FIG. 1) of the system, as depicted in FIG. 1. This is hereinafter referred to as the "sub-scanning direction".

The laser beam at the surface of the photoconductive drum is the reference point for the optical power of the optical elements. That is, the power in the main scanning direction means the power contributing to converge or disperse in the main scanning direction at the drum. The power in the sub-scanning direction means the power which contributes to converge or disperse the laser beam in the sub-scanning direction at the drum.

As shown in FIG. 1, an embodiment of a optical scanning device 100 according to the invention is arranged such that diverging light generated from a semiconductor laser 10 (laser source) is collimated by means of a collimator 11. The collimated beam then passes through a cylindrical lens 12, which converges the beam in the sub-scanning direction only. The converged beam is then reflected, at a substantially right angle, towards a polygonal mirror 14 by a flat mirror 13.

The polygonal mirror is rotatable at a high speed, turning six reflecting surfaces 14a across the beam, thereby scanning the laser beam in the main scanning direction. The scanning beam is deflected up in the sub-scanning direction by the polygonal mirror 14 at a first separation angle $\theta_1$, and is subsequently again deflected up in the general sub-scanning direction by a curved surface mirror 15 (having positive power in the main scanning direction), and directed to an anamorphic lens 16 above the polygonal mirror 14. The anamorphic lens primarily has power in the sub-scanning direction. The beam is then redirected by an optical path bending mirror 17, and illuminates the photoconductive drum 18 above the optical scanning device 100, scanning in the main scanning direction.

Thus, the laser beam forms an image, once converged in the sub-scanning direction by the cylindrical lens 12, on each reflecting surface 14a of the polygonal mirror 14. The beam then again forms an image on the photoconductive drum 18 again converged by means of the optical power of the anamorphic lens 16 in the sub-scanning direction. This structure prevents displacement of the scanning beam on the photoconductive drum 18 from tilting error of the reflecting surface 14a.

The flat mirror 13 reflects the laser beam from the cylindrical lens 12 at a substantially right angle towards the rotary axis 14b of the polygonal mirror 14. The laser beam is directed towards the rotary axis 14b of the polygonal mirror 14 to increase the angular range through which scanning is possible. Thus, given any required size of polygonal mirror 14, the scanning range is larger. Conversely, given any required scanning range, the size of the polygonal mirror 14 can be reduced. Furthermore, given this arrangement, optical field curvature occurs symmetrically about the optical axis, so that a field curvature correction is easily accomplished.

Herein, to facilitate explanation, a plane containing the optical axis of the laser beam generated by the semiconductor laser 10, and containing the optical axis of the laser beam reflected by the flat mirror 13 (and incident upon the polygonal mirror 14), is designated as a laser supply plane.

In this embodiment, the polygonal mirror 14 is a flattened hexagonal prism shape; the 6 lateral faces are reflecting surfaces, and the polygonal mirror 14 is fashioned from metal. The polygonal mirror 14 is rotated by a motor (not shown in FIG. 1) about a rotational axis 14b to scan the laser beam reflected therefrom. The rotational axis 14b of the polygonal mirror 14 is inclined at an angle of ½ of a first separation angle $\theta_1$ from a normal line of the laser supply plane. The inclination of the axis 14b of the polygonal mirror 14 deflects the laser beam at a first separation angle $\theta_1$ from the laser supply plane, in the sub-scanning direction.

The first separation angle $\theta_1$ is set to be as little as possible, but having sufficient separation from the laser supply plane (containing the flat mirror 13 and beam therefrom) to prevent interference with the flat mirror 13 with the scanning beam. Thus, the curved surface mirror 15 is placed to intercept the incoming beam at first separation angle $\theta_1$ from the polygonal mirror 14, behind the flat mirror 13 (with reference to the path of the incoming beam).

As the curved surface mirror 15 in this embodiment, a concave mirror is employed. The curved surface mirror 15 is inclined (toward the polygonal mirror 14) by an angle of substantially $(2\theta_1-\theta_2)/2$ from a normal line of the laser supply plane. The inclination of curved surface mirror 15 directs the scanning beam at a second separation angle $\theta_2$ from the first separation angle $\theta_1$, to the anamorphic lens 16. The second separation angle $\theta_2$ is as little as possible but having sufficient separation from the polygonal mirror 14 to prevent the transmission of oscillations from the rotating polygonal mirror 14 to the anamorphic lens 16.

The curved surface mirror 15 is therefore inclined towards the polygonal mirror to reduce the deflection amount in the general sub-scanning direction. Furthermore, as the laser beam is incident to the polygonal mirror 14 with an inclination causing curvature of the scanning lines, by inclining the curved mirror 15 in the direction opposite that of the polygonal mirror 14, a canceling curvature is generated, and the curvatures substantially are canceled out.

The anamorphic lens has different shapes on its incident and exit sides; that is, the sides on which the scanning beam is incident and on which the beam exits. The incident side of the anamorphic lens 16 is convex, aspherical, and rotationally symmetric about the optical axis (having no magnification power). The light exit side of the anamorphic lens 16 is concave, and rotationally asymmetric about the optical axis. The shape of the light exit side is a locus formed from the rotation of a curved, non-arc line about an axis in the main scanning direction. The anamorphic lens has almost no power in the main scanning direction, but has positive power in the sub-scanning direction gradually increasing from the edges (in the main scanning direction) to the center.

As to the sub-scanning direction, the optical axes of both surfaces of the anamorphic lens 16 are offset within the lens body towards the polygonal mirror 14 with respect to the optical axis of the optical system in the sub-scanning direction. By arranging the anamorphic lens 16 to be eccentric, or offset, in the sub-scanning direction, skew distortion, generated as the laser beam is incident on the reflection surfaces of the polygonal mirror 14 at an angle in the sub-scanning direction, is corrected. That is, since the laser beam incident on the anamorphic lens 14 scans in accordance with a locus offset from the revolution axis of the incident surface of the anamorphic lens 16 (coincident with the optical axis of the lens 16), the anamorphic lens 16 bends the laser beam asymmetrically about the optical axis in the sub-scanning direction. With this function, the skew distortion of the laser beam can be corrected. In this embodiment, as the optical axis is offset from the scanning locus, the anamorphic lens 14 is reduced in size in the sub-scanning direction on the side of the optical axis away from the scanning locus, as this portion of the lens 14 is not used. That is, the anamorphic lens 14 is formed to be of substantially equal height in the sub-scanning direction on either side of the incident scanning locus, although the optical axis is displaced toward the polygonal mirror 14 in the same direction.

A flat mirror 40 is placed between the anamorphic lens 16 and the curved surface mirror 15, just out of the scanning range used for printing, and opposing the curved surface mirror 15, at a predetermined position corresponding to the end of the scanning range. When the laser beam reflected by the curved surface mirror 15 reaches the end of the scanning range, the laser beam is reflected by the flat mirror 40 to a light sensor 42, first passing through a cylindrical lens 41 having positive power only in the sub-scanning direction. The light sensor 42 is positioned on the opposite side of the optical scanning device 100, and sends a synchronizing signal to initiate the writing of each main scan in response to each detection of the laser. The laser beam reflected by the curved surface mirror 15 is converged in the main scanning direction, but dispersed in the sub-scanning direction over the longer optical path to the detector 42, so it is reconverged at the lens 41 in the sub-scanning direction to form a spot on the light sensor 42. In case the laser beam is displaced in the sub-scanning direction, the correction function of the lens 41 leads the laser beam to the light sensor 42.

Figure 2:
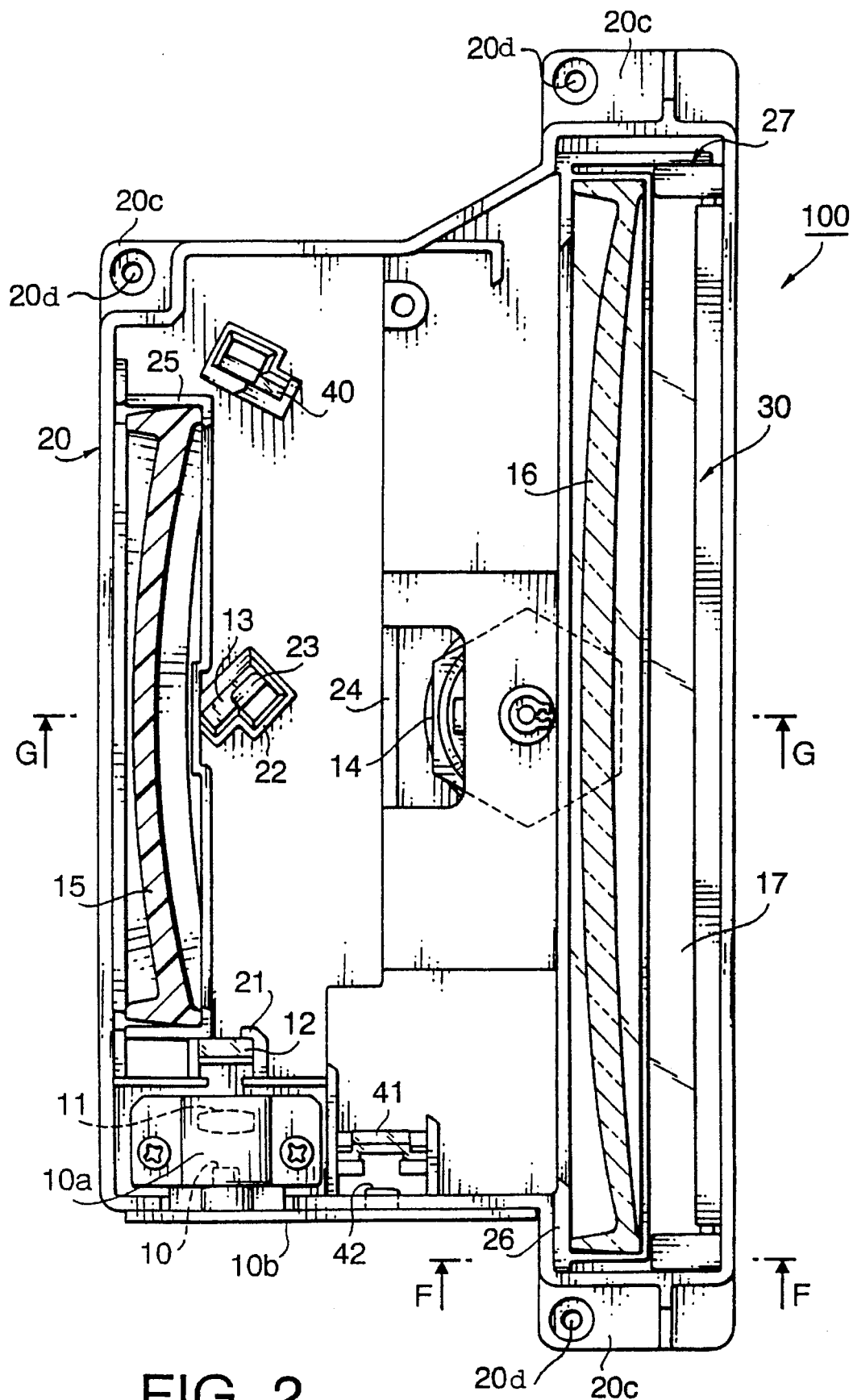
FIG. 2 is a plan view of an optical scanning device as applied in the embodiment of the invention.
Figure 3:
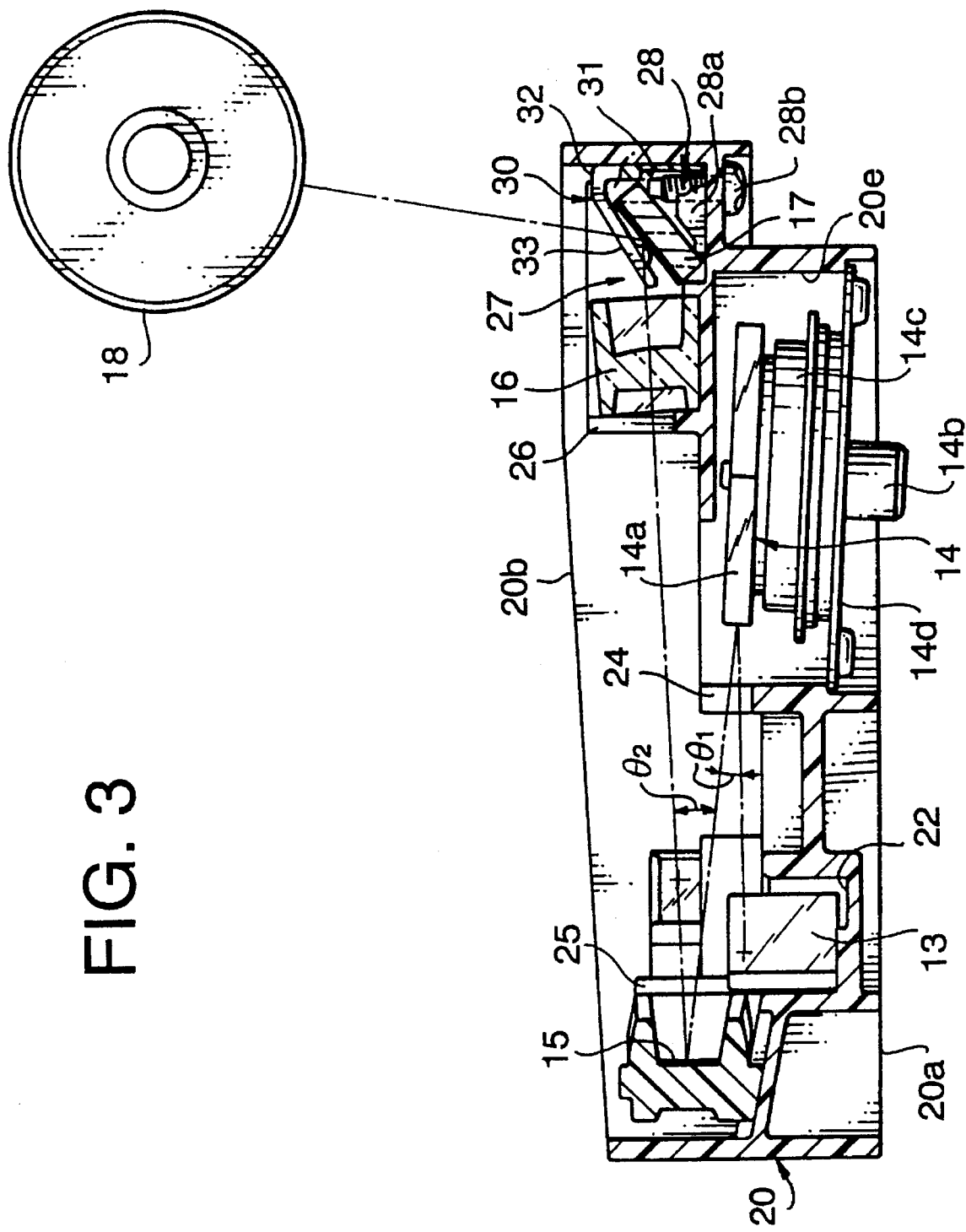
FIG. 3 is a side sectional view of the optical scanning device, taken along the line G—G of FIG. 2.
Figure 4:
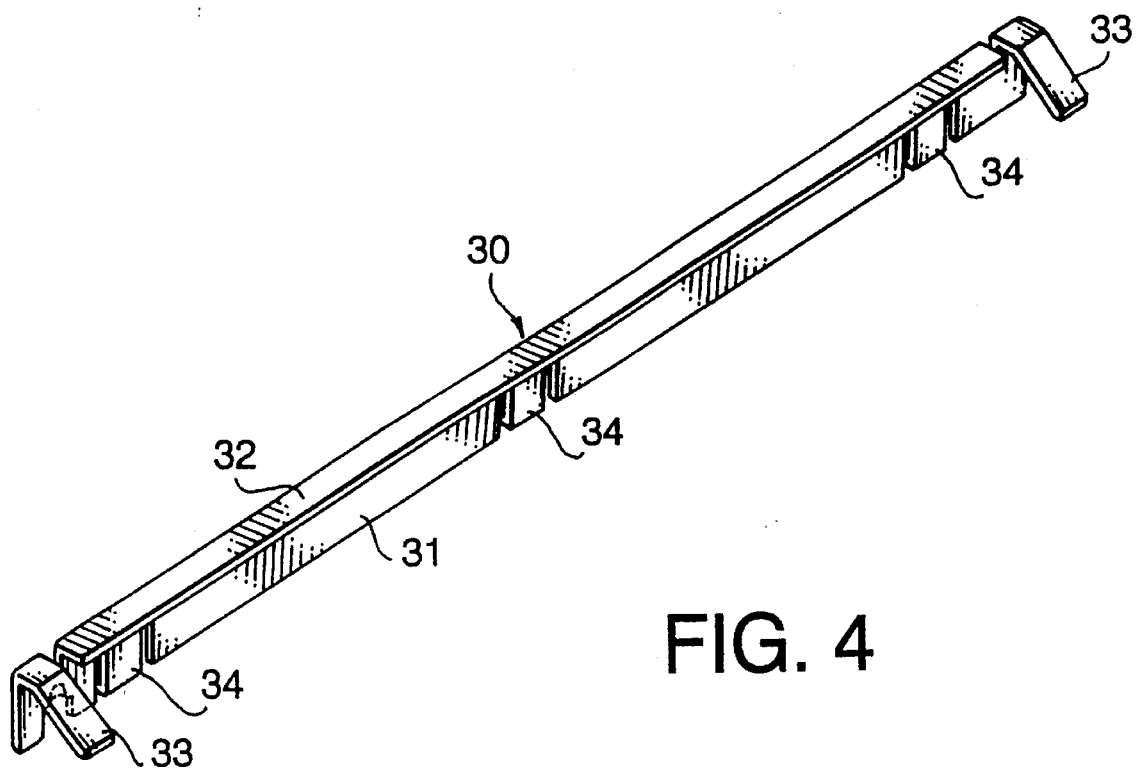
FIG. 4 is a perspective view of an optical path bending mirror fastener according to the embodiment of the invention.

FIGS. 2 and 3 show an example of actual assembly of the device. Among the above-described optical elements, elements having aspherical surfaces (i.e. the cylindrical lenses 12, 41, the curved surface mirror 15, and the anamorphic lens 16) are formed from resin plastic, and the flat elements (i.e., flat mirrors 13, 40, and the optical path bending mirror 17) are formed by coating a reflective metal layer on one surface of a glass planar element. The front reflective layer of the optical path bending mirror 17 is identified as the front mirror surface, and the opposite surface is identified as the back surface.

A housing 20, formed from resin plastic, holds the optical elements. The housing 20 is formed with reference to a mounting plane; that is, the optical scanning device is mounted in a laser beam printer or other apparatus with reference to the mounting plane, and the size of the housing in a direction normal to the mounting plane defines the thickness of the housing. A direction substantially normal to the mounting plane is the sub-scanning direction in this case. In this embodiment, a mounting surface 20a, and at least three mounting tabs 20c (each having a mounting hole 20d), are all parallel to the mounting plane.

In this embodiment, the flat mirror 13 is secured in the housing at a very small angle, such that the laser supply plane (including the central axis of the laser beam reaching the polygonal mirror 14 from the semiconductor laser 10) is very slightly inclined with respect to the mounting plane; thus, the laser beam incident on the polygonal mirror 14 is substantially parallel to the bottom surface 20a and the mounting tabs 20c of the housing 20. In the description of relationships between angles, the laser supply plane and mounting plane can be used interchangeably, as the small angle difference does not substantially change the function of the angular relationships between optical elements of the device. The flat mirror 13 and polygonal mirror 14 unit have some size in the sub-scanning direction, and the small angle relationship between the laser supply plane and the mounting plane is permitted by the accommodation of the elements in the housing 20. In this embodiment, for example, the angle between the laser supply plane and the mounting plane is 1 degree, set by inclining the flat mirror by ½ degree.

The semiconductor laser 10 and the collimator 11 are held as a unit within the laser supply plane in a metal subframe 10a, and the subframe 10a is screwed to the housing 20. A circuit board 10b bearing components for driving the semiconductor laser 10 and the light sensor 42 is mounted outside the housing 20 in the vicinity of the subframe 10a. The cylindrical lens 12 is arranged in the laser supply plane such that the cylindrical surface thereof faces the semiconductor laser 10. The cylindrical lens 12 is fixed to the housing 20 with a flat surface side thereof abutting a lens locating portion 21 formed in the housing 20. Another cylindrical lens 41, having positive power in the sub-scanning direction, is secured to the housing 20 in front of the light sensor 42. The flat mirror 13 is held in a mirror mounting portion 22 having two positioning beads for positioning the mirror formed on the back surface of thereof. The mirror 13 is secured to the mounting portion 22 by means of a metal leaf spring 23 pressed between the mirror 13 and the mounting portion 22.

The polygonal mirror 14 is mounted to the rotational axis 14b of a scanner motor 14c, and the scanner motor 14c is fixed to a motor base plate 14d. The rotational axis 14b is normal to the base plate 14d, which bears a driving circuit. A cavity in the housing 20 including a base plate mounting surface 20e, inclined from the mounting plane substantially at the aforementioned angle $\theta_1/2$, holds the base plate 14d. The base plate 14d is screwed onto the outer housing 20 from the lower side of FIG. 3. An opening 24 is formed in a side of the cavity in the housing 20, exposing a portion of the polygonal mirror 14 to the interior of the housing 20. The incident laser beam from the flat mirror 13 strikes the polygonal mirror 14 via the opening 24, and the reflected beam directed towards the curved mirror 15 also passes through the opening 24.

Figure 5A:
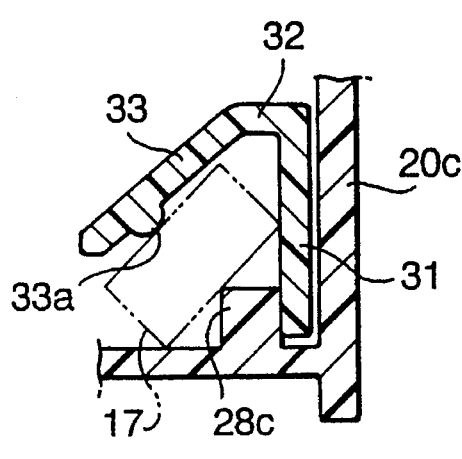
FIG. 5(a) is a side sectional view of the mirror fastener, taken along the line G—G of FIG. 2.
Figure 5B:
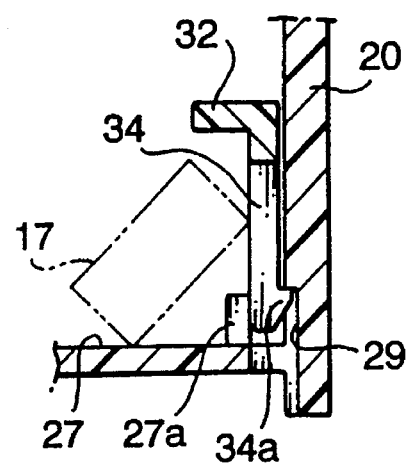
FIG. 5(b) is a side sectional view of the mirror fastener, taken along the line F—F of FIG. 2.
Figure 6:
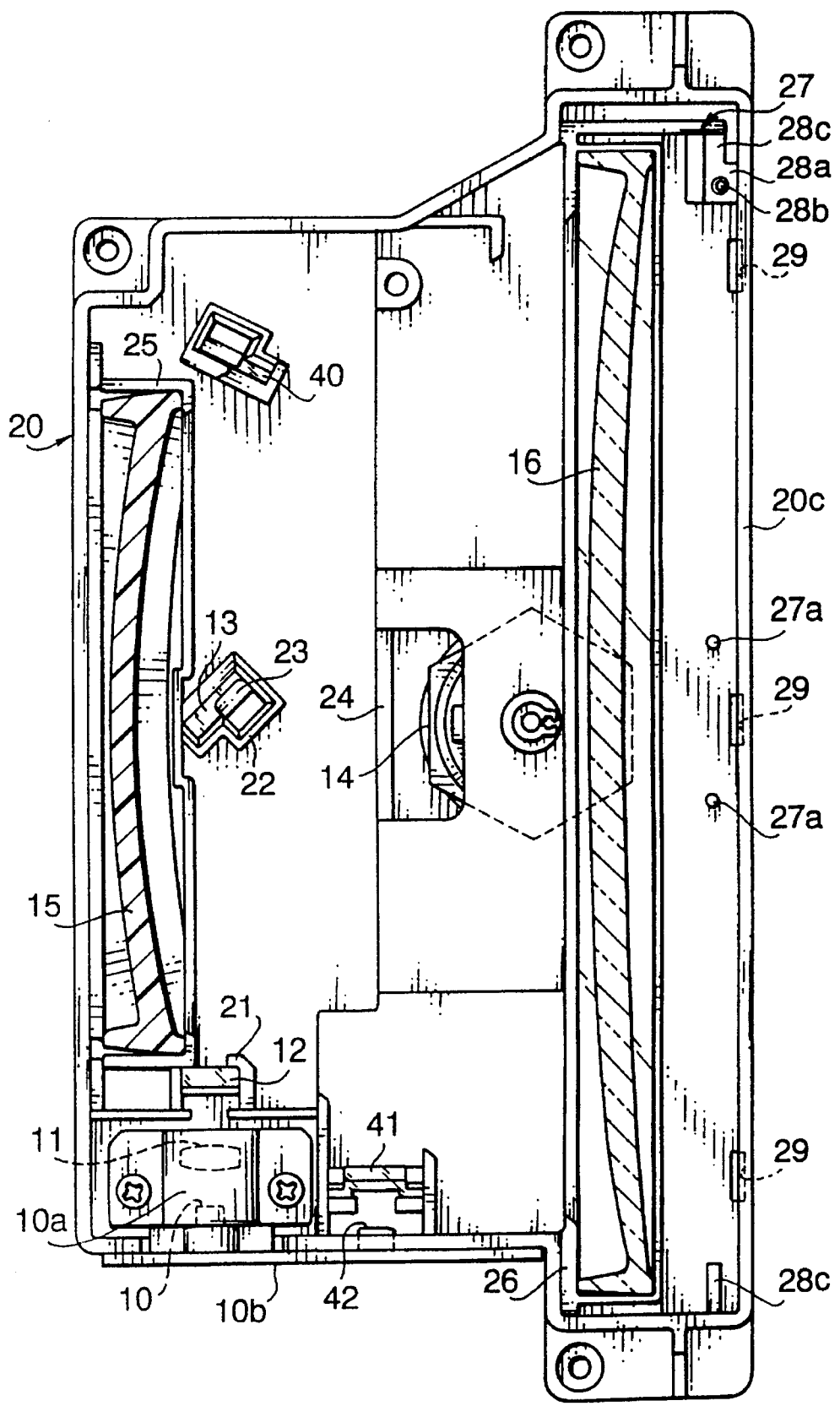
FIG. 6 is a plan view of the optical scanning device, without the mirror fastener assembled, as applied in the embodiment of the invention.

The oblong optical path bending mirror 17 is secured in the mirror mount 27 by a fastener 30. FIG. 6 shows the reflection type optical scanning device, before the optical path bending mirror 17 is secured. As shown in FIGS. 5(a) and 6, a pair of protruding portions 28c are formed at either end (in the main scanning direction) of the mirror mount 27. A pair of cylindrical protrusions 27a (see FIGS. 5(b) and 6) are formed at the central portion of the mirror mount 27 in the main scanning direction. An adjusting portion 28, for adjusting the angle of the optical path bending mirror 17, is provided on one end side of the mirror mount 27.

The adjusting portion 28 includes a stepped portion 28a integral with the mirror mount 27 of the housing 20. An adjusting screw 28b screwed from the lower side of the mirror mount 27, protrudes above the stepped portion 28a to abut the optical path bending mirror 17. By adjusting the screw 28b, the height of the point of the screw changes, pushing up the back surface of the optical path bending mirror 17, and the angle of the optical path bending mirror 17 can be minutely adjusted.

The mirror fastener 30 includes a rear wall 31, against which the back surface of the optical path bending mirror 17 rests, and an upper wall 32, forming an L shaped section. Two resilient retaining arm portions 33 are positioned at opposite longitudinal ends in the main scanning direction, for holding the front mirror surface of the optical path bending mirror. The arm portions 33 align with corresponding protrusions 28c when the fastener 30 is inserted. The arm portions 33 are formed to have a V shaped section in combination with the rear wall 31 in order to retain the mirror 17. Hemispherical protrusions 33a (see FIG. 5(a)) are formed on the inner surface of each of the arm portions 33 to point contact the front mirror surface of mirror 17.

At assembly, the oblong optical path bending mirror 17 is set in the mirror mounting portion 27 abutting stepped portions 28a. Thereafter, the mirror fastener 30 is press-inserted from the upper side behind the mirror 17 so that the back surface of the mirror 17 abuts the rear wall 31. The fastener is set to engage the hooks 34a to the slots 29 of the rear surface of the mirror mount 27 of the housing 20. The mirror 17 is thereby secured to the housing 20, and held rigidly at the bottom by the mounting portion 27 and stepped portions 28a, at the back surface by the rear wall 31 and resiliently from the front mirror surface by the arm portions 33.

Three engaging portions 34 are formed from separated portions of the rear wall 31, substantially parallel with the rear wall 31 and bounded by portions of the rear wall 31 on lateral sides. Each engaging portion is tipped by a hook portion 34a (see FIG. 5(b)) extending in the direction of a rear surface 20c of the mirror mount 27 of the housing 20. As shown in FIG. 6, three engaging slots 29 are formed, at positions corresponding to the engaging portions 34, in the rear surface 20c of the mirror mount 27 of the housing 20. When the mirror fastener 30 is attached, the resilient engaging portions 34 resiliently deform as the fastener 20 is inserted, and the hooks 34a then snap into the engaging slots 29 of the rear surface 20c of the mirror mount 27. Thus, the rear wall 31, bounding the engaging portions 34 on lateral sides thereof, abuts both the protruding portions 28c and the protrusions 27a, preventing movement of the mirror fastener 30 in the direction of the anamorphic lens 16. In this manner, the mirror fastener 30 is secured, thereby securing the optical path bending mirror 17.

As illustrated in FIG. 5(a), the back surface of the optical path bending mirror 17 abuts the protrusions 28c from a first side, and the rear wall 31 of the mirror fastener 30 contacts the protruding portions 28c from the (second) opposite side. The mirror fastener 30 is constructed such that the angle between the arm portion 33 and rear wall 31, before assembly, is smaller than in the assembled state indicated in FIG. 5(a). Accordingly, in the assembled condition illustrated in FIG. 5(a), the arm portion 33 resiliently biases the optical path bending mirror 17 against the protruding portions 28C and the rear wall 31, while the rear wall 31 is resiliently pushed against the (second) opposite side of the protruding portions 28c.

Thus, when the optical path bending mirror 17 is set in the mirror mounting portion 27 abutting the protruding portions 28c, it may be easily secured by merely press inserting the mirror fastener 30 from above to engage the hook portions 34a to the engaging slots 29 of the mirror mount 27 of the housing 20.

The present disclosure relates to subject matter contained in Japanese Patent Application No. HEI 06-287386, filed on Oct. 27, 1994, which is expressly incorporated herein by reference in its entirety.

What is claimed is:

1. A mirror securing apparatus for an optical scanning device, said mirror securing apparatus comprising:

an oblong mirror having a front mirror side for reflecting a scanning light beam and a back side, said oblong mirror extending in a main scanning direction of said optical scanning device;

a mirror mount formed in the optical scanning device and having a rear surface formed therein;

a plurality of protrusions formed on said mirror mount, each of said protrusions having a first side for contacting said back side of said oblong mirror and a second side opposite said first side, said second side facing said rear surface of said mirror mount and having a clearance therebetween; and a fastener for holding said oblong mirror in said mirror mount, said fastener comprising:

a rear wall arranged between said back side of said oblong mirror and said rear surface of said mirror mount, said rear wall having substantially the same length in said main scanning direction as said oblong mirror;

at least two resilient arm portions extending from said rear wall, for holding said oblong mirror at least toward opposite ends in said main scanning direction of said oblong mirror; and at least one resilient engaging portion for engaging said rear surface, said at least one resilient engaging portion being inserted in said clearance between said second side of said protrusions and said rear surface of said mirror mount.

2. The mirror securing apparatus according to claim 1, wherein said resilient arm portions are formed at least toward opposite ends in said main scanning direction of said rear wall; and wherein said resilient arm portions hold said back side of said oblong mirror against said first side of said protrusions.

3. The mirror securing apparatus according to claim 2, wherein said at least two resilient arms are positioned in said main scanning direction to align with corresponding protrusions of said plurality of protrusions.

4. The mirror securing apparatus according to claim 1, wherein said at least one resilient engaging portion further comprises means for resiliently pressing said rear wall against said second side of said protrusions.

5. The mirror securing apparatus according to claim 1, wherein said mirror mount has a bottom surface formed therein, and said plurality of protrusions are formed on said bottom surface spaced apart from each other in said main scanning direction.

6. The mirror securing apparatus according to claim 1, wherein said resilient arm portions comprise a hemispherical protrusion near a distal end thereof for point contacting said front mirror side of said oblong mirror.

7. The mirror securing apparatus according to claim 1, wherein said rear surface of said mirror mount has engaging slots formed therein for mating with said engaging portions; and wherein each of said engaging portions has a hook for mating with corresponding ones of said engaging slots of said mirror mount formed at a distal end thereof, said hook extending in the direction of said rear surface of said mirror mount, and each of said engaging portions being substantially coplaner with said rear wall and resiliently swingable with respect to said rear wall.

8. The mirror securing apparatus according to claim 1, further comprising:

an adjusting portion for adjusting an angle of said optical path bending mirror provided to one end, in said main scanning direction, of said mirror mount.

9. The mirror securing apparatus according to claim 8, wherein said adjusting portion comprises:

a stepped portion integral with said mirror mount; and an adjusting screw penetrating said stepped portion and contactable to said back side of said mirror, wherein said adjusting screw is rotatable to minutely adjust said angle of said optical path bending mirror.

10. The mirror securing apparatus according to claim 1, further comprising:

a pair of cylindrical protrusions formed at a central portion of said mirror mount in said main scanning direction for preventing movement of said fastener.

11. The mirror securing apparatus according to claim 1, wherein said back side of said oblong mirror contacts said rear wall of said fastener.

12. The mirror securing apparatus according to claim 1, wherein each of said at least two resilient arm portions are formed to have a V shape in combination with said rear wall.

13. A mirror securing apparatus for an optical scanning device, said mirror securing apparatus comprising:

an oblong mirror having a front mirror side for reflecting a scanning light beam and a back side, said oblong mirror extending in a main scanning direction of said optical scanning device;

a mirror mount formed in said optical scanning device and having a rear surface formed therein;

a plurality of protrusions formed on said mirror mount, each of said protrusions having a first side for contacting said back side of said oblong mirror and a second side opposite said first side, said second side facing said rear surface of said mirror mount and having a clearance therebetween; and a fastener for holding said oblong mirror in said mirror mount, said fastener comprising:

first resilient means for pressing said fastener against said second side of said protrusions;

second resilient means for pressing said back side of said oblong mirror against said first side of said protrusions, said second resilient means acting on said front mirror side of said oblong mirror;

engaging means for engaging said fastener to said rear wall of said mirror mount.

\* \* \* \* \*

UNITED STATES PATENT AND TRADEMARK OFFICE
CERTIFICATE OF CORRECTION

PATENT NO. : 5,592,337

DATED : January 7, 1997

INVENTOR(S) : Yoshihiro HAMA

It is certified that error appears in the above-indentified patent and that said Letters Patent is hereby corrected as shown below:

On the cover, in section [56], "References Cited", "FOREIGN PATENT DOCUMENTS", line 1, change "6/1994" to --- 9/1994---.

Signed and Sealed this

Twenty-second Day of April, 1997

Attest:

BRUCE LEHMAN

*Commissioner of Patents and Trademarks*

*Attesting Officer*